United States Patent [19]

Enga

[11] Patent Number: 4,509,327

[45] Date of Patent: Apr. 9, 1985

[54] REGENERATING CATALYTIC PARTICULATE FILTERS AND APPARATUS THEREFOR

[75] Inventor: Bernard E. Enga, West Chester, Pa.

[73] Assignee: Johnson Matthey, Inc., West Chester, Pa.

[21] Appl. No.: 461,586

[22] Filed: Jan. 27, 1983

[51] Int. Cl.³ .............................................. F01N 3/02
[52] U.S. Cl. ...................................... 60/274; 60/285; 60/311
[58] Field of Search ................. 60/274, 285, 286, 295, 60/297, 311

[56] References Cited

U.S. PATENT DOCUMENTS

| | | | |
|---|---|---|---|
| 4,211,075 | 7/1980 | Ludecke | 60/285 |
| 4,380,149 | 4/1983 | Ludecke | 60/274 |
| 4,395,875 | 8/1983 | Virk | 60/274 |
| 4,404,796 | 9/1983 | Wade | 60/274 |

Primary Examiner—Douglas Hart
Attorney, Agent, or Firm—Cushman, Darby & Cushman

[57] ABSTRACT

A method and apparatus for regenerating a catalyzed particulate filter in the exhaust stream of a combustion source (particularly a diesel engine) are provided that do not necessitate excessive heating of the exhaust stream flowing from the combustion source. During regeneration the intake air is supplied in a pulsed manner, preferably but not necessarily, to less than all of the cylinders of the engine so that the combined engine exhaust carries sufficient "fuel", primarily in the form of a carbon monoxide and a hydrocarbon fraction, that will be catalytically oxidized thereby generating an exotherm. Due to the liberation of heat during that carbon monoxide and hydrocarbon oxidation above the light-off temperature of the filter, the particulates stored by the filter will be ignited and burned cleaning and regenerating the filter.

23 Claims, 6 Drawing Figures

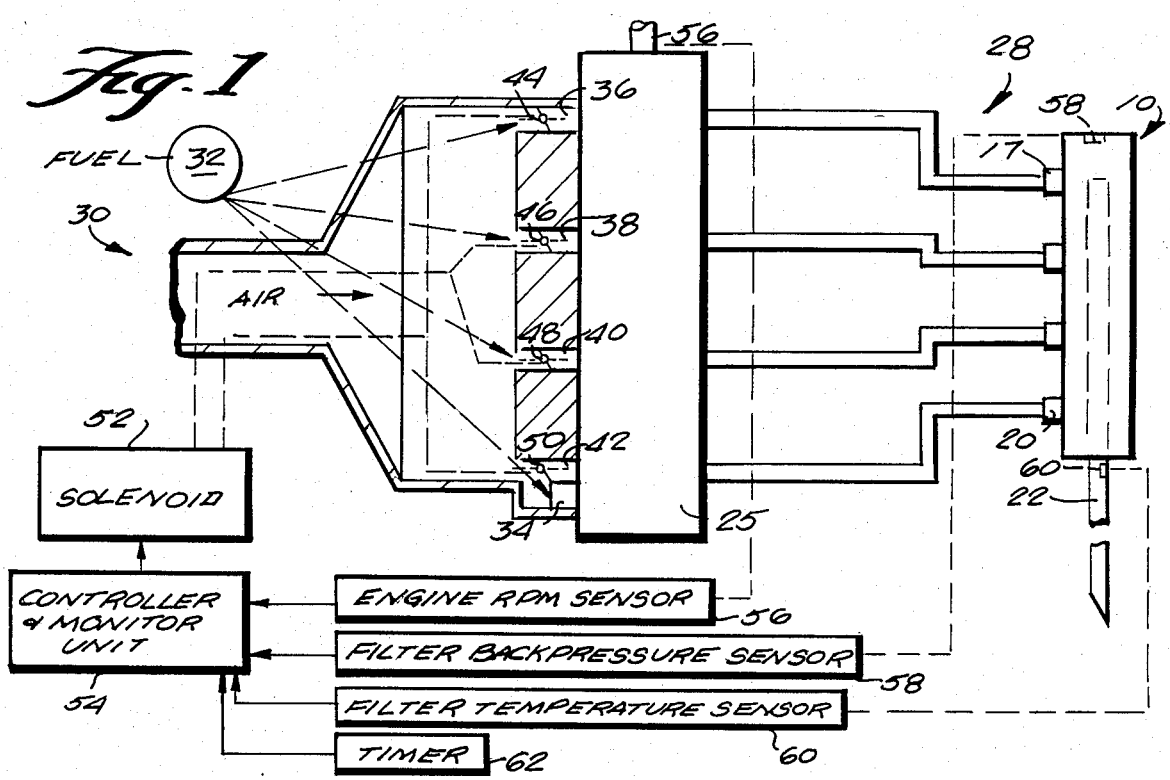
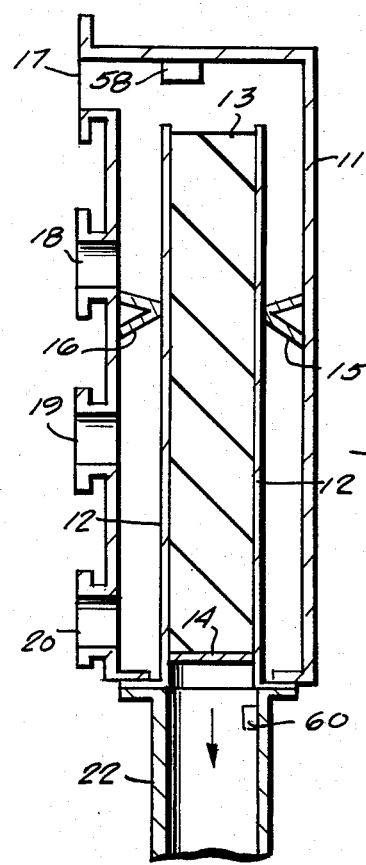
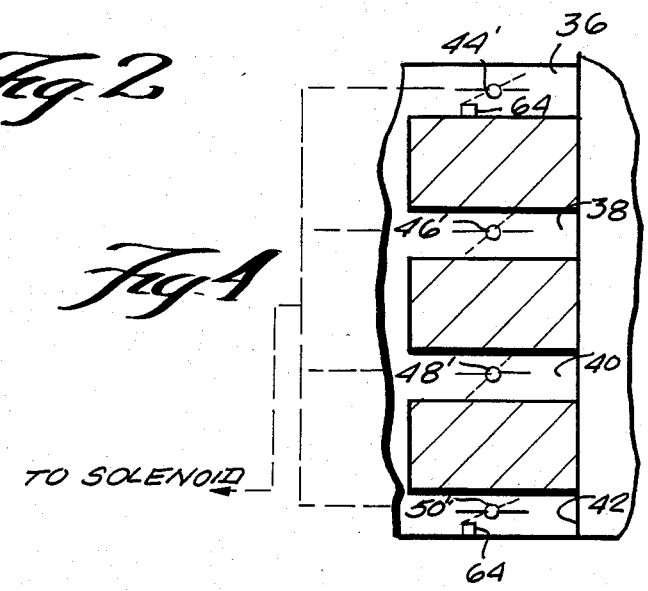

REGENERATING CATALYTIC PARTICULATE FILTERS AND APPARATUS THEREFOR

BACKGROUND OF THE PRESENT INVENTION

Exhaust streams from combustion sources, particularly from diesel engines, may be required to have particulate filters located within the exhaust system to clean the exhaust stream prior to discharge to the atmosphere. In order to provide an effective long-life for such filters, it is necessary to occasionally remove the collected particulates especially since too great an amount can clog the filter and create undesirable back pressure, which in the case of diesel engines, is most undesirable.

Conventionally, such as shown in U.S. Pat. No. 4,211,075, this is accomplished by a regenerator system which ignites the stored particles, burning them off, and thus cleaning the filter. The majority of such systems act to raise the exhaust temperature to a level at which the particulates ignite. This is done primarily either by throttling the entire air intake or by blocking whole sections of the engine to render them inoperative or by igniting a pilot burner to actively raise the exhaust gas temperature. Other examples of known systems are shown in U.S. Pat. No. 4,270,936 and German Offenlegungsschrift No. 2756570 which both use electric heaters to raise the temperature of the filter.

Techniques relating to throttling the intake air of combustion sources, primarily engines, while capable of increasing exhaust gas temperatures, also creates undesirable and detrimental problems particularly because the throttling itself leads to oxygen deficient operation of the engine during the regeneration cycle. This, in turn, can lead to uncontrollable temperatures during the particular burning stage. I have observed that at the various rpm and load points that there are particular points of throttling where beyond that point the engine would "stumble" and emit large quantities of CO, HC and particulates. This "stumbling" phenomenon appears to be always accompanied by oxygen levels in the exhaust gases which are below the minimum required for filter regeneration.

According to the present invention, a method and apparatus are provided for regenerating catalytically coated particulate filters, such as the type of filter shown in copending U.S. patent applications Ser. No. 161,873 filed June 23, 1980 (now abandoned) and refiled on Dec. 29, 1982 as Ser. No. 448,277, and Ser. No. 55,403 filed July 6, 1979 (now abandoned) and refiled on Sept. 30, 1982 as Ser. No. 429,423; and such as shown in published British applications Nos. 2,024,646 and 2,054,402A. It is desirable to provide regeneration of such filters without effecting a substantial rise in the exhaust gas temperature. Rather, ignition and burn off of the stored particulates is effected, according to the present invention, by controlling the content of the exhaust from the engine and most particularly by controlling the exhaust emitted by the plurality of cylinders in that engine, either grouped into pairs or individually. By so doing, the combined exhaust from the cylinders can be effectively regulated so that there exists in the exhaust stream, at the point the various exhaust streams are mixed together, sufficient "fuel" for the filter's catalyst to generate an exotherm. In turn, that exotherm will ignite the particulates or at least create hot spots adjacent or within the collected particulates with the subsequent ignition in either case serving to clean and thus "regenerate" the filter.

The catalyst coating on catalyzed filters develops an exotherm when oxidizable fuels, such as carbon monoxide and gaseous hydrocarbons, in the presence of sufficient oxygen are presented to the catalyst above the temperature at which the catalyst is active, typically above 200° C. The exotherm being generated thereby will depend upon the quantity of the "fuel" being supplied and also the catalyst activity.

The present invention may be practiced with any catalyzed particulate filter associated with an exhaust stream from a combustion source. However, the invention is particularly applicable to exhaust streams from diesel engines. The present invention is primarily practiced by presenting to a catalyzed filter gaseous fuel emissions from the combustion source at a temperature that is above the filter's gaseous "light-off" temperature. The "light-off" temperature of a catalyzed filter differs from filter to filter and is different for each species of material (gas, particulate, etc.) to be oxidized. The appropriate and respective "light-off" temperature may be determined experimentally. For instance, a portion of a catalyst may be heated gradually raising the temperature together with particulate matter collected from the exhaust gas stream of a combustion source in the sample pan of a differential scanning colorimeter in an atmosphere of 1% oxygen and argon. Samples of the atmosphere above the sample pan are taken via a heated capillary tube to a mass spectrometer. Four mass numbers are traced, (1) carbon monoxide, (2) doubly charged argon, (3) oxygen and water or nitrogen, and (4) carbon dioxide. The temperature at which the differential plot of the differential scanning colorimeter peaks is taken to be the temperature at which the combustion of the particles took place, and this temperature is the "light-off" temperature for the ignition of the particulate.

The present method comprises the steps of: during operation of the combustion source, presenting to the catalyzed filter above its gaseous emission light-off temperature gaseous exhaust containing sufficient "fuel", sufficient to generate an exotherm so that the catalyzed filter heats up and ignites stored particulates in the filter and in contact with the catalyst over a period of time sufficient to burn up a substantial quantity of the particulates previously collected and stored in the filter.

According to one primary aspect of the present invention, the method and apparatus provide an efficient way to increase oxygen levels in the exhaust stream at or just prior to the "stumbling" point. This is accomplished by "pulsing", or only intermittently operating the throttle system according to a predetermined operating cycle. In general, throttling, according to the present invention, would be applied leading to the "stumbling" point and the high gaseous emissions with appropriate controls to remove the throttling effect which in turn leads again to increased oxygen content in the exhaust. The resulting high gaseous and oxygen exhaust streams flowing from respectfully controlled cylinders are mixed in the exhaust system prior to contact with the catalyst, with the mixed gases comprising the "fuel" for regeneration purposes.

The pulsating of the intake air step of the method herein may be practiced periodically, either manually or automatically, in response to a variety of sensed conditions or combinations thereof. Such conditions preferably include but would not be limited to engine revolutions or backpressures caused by the filter itself. When regeneration is practiced, it is preferably practiced for a preset time interval, of at least several seconds, so that a substantial amount of the stored particulates are burned up and the filter regenerated.

The pulsating of the intake air step may be practiced in a number of different ways. One way is to employ a multi-point control system which, for an engine having a plurality of cylinders each having its own intake manifold line, modifies those intake manifold lines by placing a small butterfly valve in each. This enables the engine to be throttled on a cylinder by cylinder basis, permits very quick response times and enables high pulsation speeds or cycles. Specifically, with reference to a four cylinder engine and numbering the cylinders, 1, 2, 3 and 4, from front to rear, the two central cylinders, 2 and 3, can be controlled as a pair independently of cylinders 1 and 4. By controlling the butterfly valves of cylinders 2 and 3 to the point where the valves are rapidly cycled through closed and open conditions, with those cylinders becoming emitters of a low oxygen content exhaust rich in CO and HC. Cylinders 1 and 4 on the otherhand, can be operated normally so that they produce a normal, oxygen rich exhaust. Such an operating mode separates the rich gas from the high oxygen gas by half of one engine revolution with the flow of exhaust within the filter providing sufficient mixing for the exhaust from cylinders 1-4 to generate a good exotherm quickly on the catalyst once the "fuel" comes in contact with the catalyst itself.

Another way is to connect each of the four butterfly valves together for cylinders 1-4 so they can be simultaneously activated, but to control the extent to which valves for cylinders 1 and 4 can close, by means of appropriately placed stop that will limit value closure. In this manner the valves controlling intake air flow for cylinders 1 and 4 will only be partially throttled during each pulsation within the cycle. In addition to butterfly valves, rotating vanes could also be used with vanes rotating through 360° in accordance with a predetermined but regulatable rpm.

According to the present invention, an apparatus for practicing the different aspects of the method according to the invention, as described above, is also provided. By practicing the present invention, it is possible to control the particulates emitted from a diesel engine in a vehicle to about 0.1 grams per mile, and to provide automatic regeneration of the filter without significant driver perception of the regenerator operation.

It is the primary objective of the present invention to provide a simple and effective method and apparatus for regenerating a catalyzed particulate filter in a combustion source exhaust stream. This and other objects of the invention will become clear from an inspection of the detailed description of the invention, and from the appended claims.

BRIEF DESCRIPTION OF THE DRAWINGS

FIG. 1 is a schematic view illustrating the preferred embodiment of an exemplary apparatus according to the present invention;

FIG. 2 is a schematic longitudinal cross-sectional view of an exemplary catalyzed particulate filter utilizable in the apparatus in FIG. 1;

FIG. 3a is a schematic view of a butterfly valve used in the intake line for each engine cylinder;

FIG. 3b is a schematic view of a rotating vane that could be employed in lieu of the butterfly valve shown in FIG. 3;

FIG. 4 is a schematic view of an alternative embodiment where the pulsating air intake values are tied together.

DETAILED DESCRIPTION OF THE DRAWINGS

Figure 5:
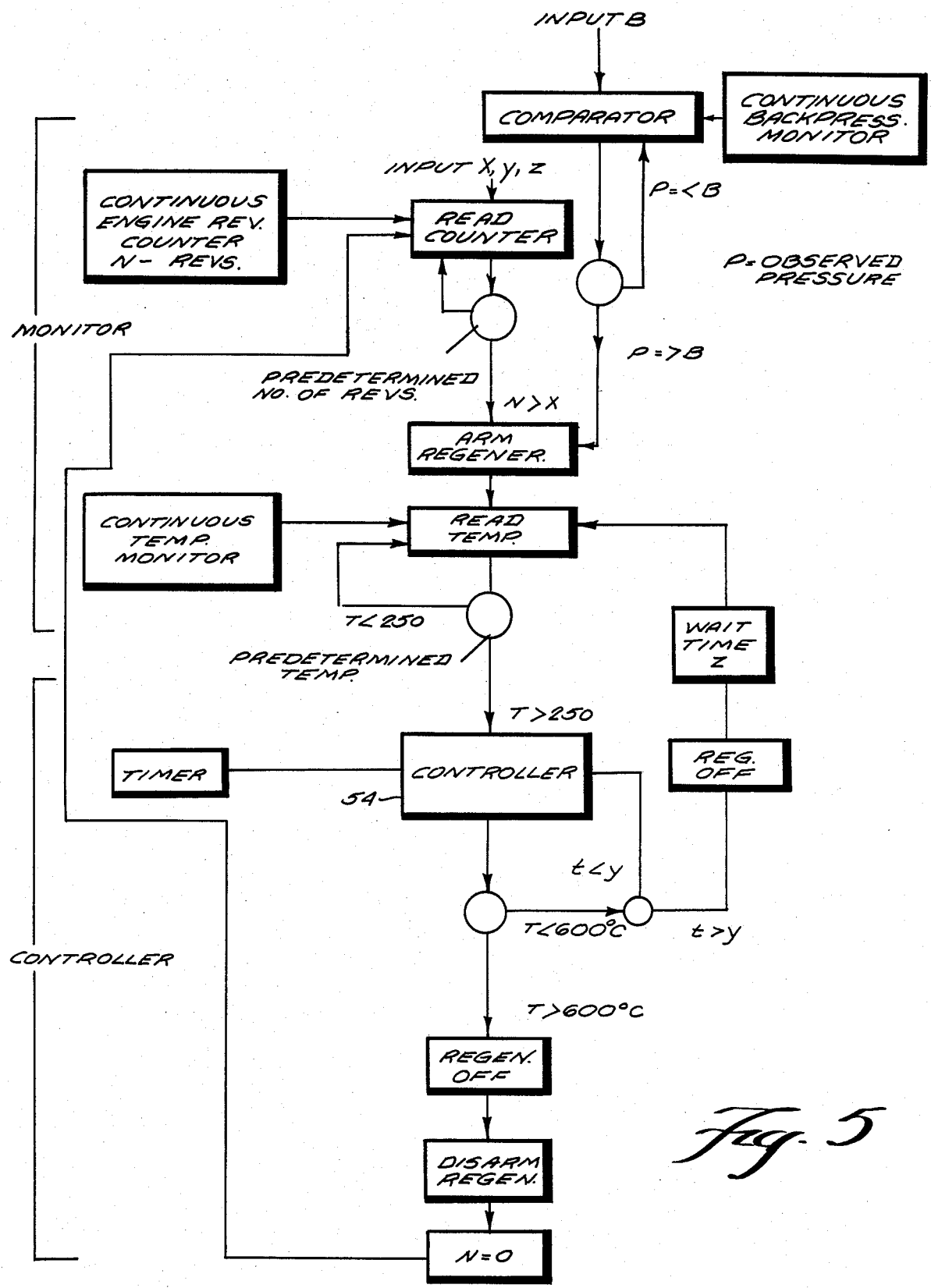
FIG. 5 is a flow diagram for the automatic controller/monitor unit.

An exemplary catalyzed particulate filter according to the present invention is shown generally by reference numeral 10 in FIG. 1. While the invention can be practiced with any regeneratable catalyzed particulate filter, the preferred particulate filters are disclosed in copending U.S. application 161,873 filed June 23, 1980 (now abandoned) and refiled as Ser. No. 448,277 on Dec. 29, 1982 or Ser. No. 55,403 filed July 6, 1979 (now abandoned) and refiled as Ser. No. 429,423 on Sept. 30, 1982, or British published applications Nos. 2,024 646 or 2,054,402A, (the disclosures of each which are hereby incorporated by reference herein).

One typical catalyzed particulate filter that can be used according to the present invention is shown in U.S. application Serial No. 161,873 above, shown in more detail in FIG. 2. This filter 10 comprises an outer casing 11 with an interior reaction tube 12 containing a supported catalyst 13. The reaction tube 12 may be mounted in a variety of positions within the housing 11, for example by struts 15, 16, so that one end 12' of tube 12 is open to receive exhaust gas flow therethrough. At the opposite exit end of tube 12 a retaining bar 14 is positioned, placed to insure that catalyst 13 remains in position. The housing 11 has openings such as at 17, 18, 19 and 20, adjacent to and continuous with each of the exhaust ports of the cylinders from an internal combustion engine 25. A single exit 21 is provided from housing 11 which is in communication with exhaust pipe 22. Accordingly, all of the exhaust gases introduced into housing 11 through inlets 17 through 20 flow through the supported catalyst 13, as indicated by the arrows in FIG. 2 and then through exit 21 into exhaust pipe 22.

The supported catalyst 13 may comprise a wide variety of structures, but preferably is a knitted wire mesh fabricated either into a single monolith, in a plurality of annular sections or whatever form is most convenient or desired. A layer of wash coat and a catalytic layer are applied to the mesh either prior to assembly and/or insertion into reaction tube 12, or following placement within reaction tube 12. The thickness of the wire is preferably between 0.001 and 0.02 inches and may comprise a nickel-chromium alloy; an alloy or iron including at least one of the elements chromium, aluminum, cobalt, nickel, and carbon; or an alloy such as shown in U.S. Pat. No. 3,298,826, or as set forth and described in U.S. Pat. No. 3,027,252 (the disclosures of which are hereby incorporated by reference herein). The wash coat layer comprises an adherent refractory metal oxide; and the catalytic metal comprising the catalytic layer on the base metal substrate is preferably selected from the group consisting of Ru, Rh, Pd, Ir, Pt, Fe, Co, Ni, V, Cr, Mo, W, Y, Ca, and alloys thereof, and intermetallic compounds containing at least 20% by weight of one or more of the metals disposed upon the surface or throughout the refractory metal oxide wash-coat layer.

In FIG. 1, exemplary apparatus according to the present invention is shown schematically and includes a combustion source 25 having a fuel supply 32 and exhaust system generally indicated at 28 and an air intake system, generally indicated at 30. Preferably, the combustion source 25 comprises a diesel engine having a purality of cylinders, such as a diesel engine in a motor vehicle, and the fuel supply 32 includes a fuel injection pump (not shown), and an injector 34 associated with each cylinder of engine 25 (only one injection 34 is shown for clarity).

For exemplary purposes, the engine shown in FIG. 1 has four cylinders and four separate intake manifold inlet lines, one for each, respectively numbered 36, 38, 40 and 42. A butterfly valve, 44, 46, 48 and 50, is provided in each of the intake manifold lines, respectively. These valves can be controlled by any convenient actuating means, such by solenoids, the actuator means or system, being generally indicated at 52. While it would be possible to control each valve separately through its own actuator and separate linkages (not shown) I prefer to group the valves into pairs. However, for a three or odd numbered cylinder arrangements, individual cylinders could be controlled according to the present invention. Accordingly, valves 46 and 48 for the two interior cylinders are tied together by conventional linkage structures so that they operate as one pair while valves 44 and 50 for the two outer cylinders are likewise tied together and operate as a second pair.

The actuation system 52 is controlled by a combined micro-computer controller and its monitoring unit, referred to herein jointly at 54. A flow diagram of the monitoring functions and the controller operation, as pre-established by inuts X, Y, Z and B for the micro-computer, is shown in FIG. 5 and the operation of the controller is considered to be conventional and known to those skilled in the art.

Input "X" corresponds to engine revolutions; input "Y" is a preset time interval for the regeneration sequence itself; input "Z" constitutes an acceptable waiting time between successive regeneration sequences; and input "B" corresponds to a predetermined maximum back-pressure caused by the filter. It should be understood that there should be a series of back-pressure settings "B" to correspond to various rpm rates, from idle to full speed conditions, and low to high filter temperatures, as back-pressures caused by the filter are subject to some variation due to either or both of these parameters.

As shown in FIGS. 1 and 5, the controller/monitor unit 54 can be provided with a plurality of sensing elements, with those sensors and their function being selected depending upon what is most appropriate or desirable for any given engine or operating environment. It should be understood that the controller/monitor unit 54 will control activation as well as deactivation of the actuation system 52 and thus the arming or initiation of the regeneration sequence as well as the shutting off or termination of that regeneration process. Further, the regeneration process can be "disabled" or prevented from starting when it is not needed.

One of the sensors 56, could sense when a predetermined number of engine revolutions N has occurred, with the number being previously calculated for the particular engine being used and the amount of particulates that would be generated for that amount of operation. Sensor 58 could be employed as for example as shown in FIG. 2 directly before the filter element itself, for sensing back-pressure caused by the exhaust stream 28.

Additionally sensor 60 could sense temperatures at the exhaust side of or after the filter unit and thus be able to supply signals corresponding to filter temperatures on which the controller can decide whether to begin or terminate the regeneration process. Further, a timer 62 could be used to set the actual regeneration process length "Y" (in seconds). The regeneration process will preferably produce temperatures T in excess of 600° C. during regeneration. If such temperatures are not reached it is preferred not to keep trying by reinitiating another regeneration sequence but rather to wait a pre-set time interval "Z" before regeneration can again be initiated. Thus, after the time interval "Y" has elapsed, if the temperature is not in excess of 600° C. then regeneration will be stopped and time interval "Z" will be observed, notwithstanding the other sensed parameter conditions.

Thus, the operation of the apparatus, as illustrated schematically in FIG. 1, can be initiated by controller/monitor unit 54, automatically by sensors monitoring engine revolutions or back-pressure conditions. The appropriate actuators would be periodically actuated or pulsated and would operate through conventional linkage structures to open and close butterfly valves 46 and 48 in a predetermined cycle. Depending upon the desired exhaust output, for a particular engine, the valves 46 and 48 would be maintained in a closed condition for a predetermined period of time, under control of controller/monitoring unit 54, and then followed by being opened for another period with that cycle being repeated throughout the regeneration sequence. Preferably, when valves 46 and 48 are closed they would provide a sufficient cutoff of intake air to those cylinders so that operation thereof would approach their "stumbling" point while the two outermost butterfly valves 44 and 50 would remain open. Preferably, valves 46 and 48 would remain closed for 75% of the operating cycle.

The closing and opening periods for each controlled and operated valve within each cycle can vary from about 0.25 sec. to about 30 sec. with the most preferred cycle frequency being 1.5 sec. closed and 0.5 sec. opened. At this cycle frequency I have found that during the closed portion of the cycle the engine generates a rich-lean cycle at a frequency of 2+ (twice) the engine rpm.

By controlling valves 46 and 48 in this manner, their throttling effect would allow their cylinders to emit a rich fuel exhaust, having a low oxygen content but high CO and HC components (rich exhaust). Simultaneously, the cylinders under control of valves 44 and 50, which would remain open, would be operated normally and would be producing a normal oxygen rich exhaust (lean exhaust). This operating mode results in the mixture of these two exhaust gas streams during their passage into and within filter 13 which provides sufficient mixing for the catalyst so it can utilize these mixed gases and generate a very good exotherm very quickly. It was noticed that CO and HC tailpipe emissions were significantly reduced to below baseline levels during the regeneration process, thus, demonstrating that the increase gaseous emissions were being used for regeneration purposes.

During one series of regeneration experiments carried out with the apparatus as described above, the engine was operated at 2,000 rpm with a sufficient load to give a catalyst inlet temperature above 200° C. A fresh reactor was determined to have a back pressure under these conditions of 13.8 inches of $H_2O$ (36 mbar). The engine was operated and back pressure was monitored so that when the reactor back pressure reached 20 inches of $H_2O$ (52 mbar), the regenerator system and monitoring unit 54 were activated and intake air flow was pulsated at a fixed frequency. Shown below in Table 1 are the results from this experiment:

TABLE 1

| Regeneration No. | Catalyst Exit Temp. °C. | | Back Pressure $H_2O$ | | Time (sec) |
|---|---|---|---|---|---|
| | Start | Max. | Start | Final | |
| 1. | 301° | 530° | 23" | 12" | 120 |
| 2. | 245° | 430° | 22" | 16" | 240 |
| 3. | 216° | 267° | 23.5" | 23.5" | 360 |
| 4. | 241° | 270° | 28" | 28" | 240 |
| 5. | 301° | 610° | 39.6" | 11.3" | 90 |
| 6. | 296° | 560° | 16" | 10.2" | 120 |
| 7. | 244° | 540° | 20" | 8.9" | 180 |
| 8. | 280° | 525 | 20" | 12" | 180 |
| 9. | 312° | 520° | 28" | 13.1" | 120 |
| 10. | 297° | 515° | 30" | 14" | 270 |
| 11. | 304° | 510° | 45" | 18" | 240 |
| 12. | 297° | 535° | 20" | 13.8" | 240 |
| 13. | 290° | 500° | 28" | 15.5" | 120 |
| 14. | 294° | 540° | 21" | 14" | 180 |
| 15. | 299° | 490° | 17.2" | 13" | 120 |
| 16. | 262° | 547° | 38" | 15" | 300 |
| 17. | 310° | 515° | 20" | 14.7" | 150 |
| 18. | 304° | 520° | 21" | 14" | 120 |
| 19. | 304° | 520° | 27" | 15" | 180 |
| 20. | 302° | 510° | 14" | 14" | 120 |
| 21. | 306° | 510° | 28" | 14" | 120 |
| 22. | 292° | 520° | 52" | 17" | 180 |

Subsequent experiments on a test vehicle operated at 40 miles per hour produced the following, typical, regeneration history which shows a successful regeneration as the back-pressure was reduced to a clean level, notwithstanding that filter temperature did not exceed 600° C.

TABLE II

| Time | Inlet Temp °C. | Outlet Temp °C. | Back Pressure ins $H_2O$ | |
|---|---|---|---|---|
| −10 secs. | 275 | 275 | 14.5 | (start) |
| −5 secs. | 275 | 275 | 14.5 | |
| 0 | 275 | 275 | 14.5 | (Regen on) |
| 5 secs. | 300 | 280 | 11.0 | |
| 10 secs. | 320 | 290 | 11.5 | |
| 13 secs. | 330 | 290 | 11.7 | |
| 18 secs. | 335 | 295 | 11.9 | |
| 20 secs. | 340 | 297 | 12.0 | |
| 23 secs. | 340 | 298 | 12.6 | |
| 25 secs. | 345 | 300 | 12.7 | |
| 30 secs. | 350 | 305 | 13.0 | |
| 33 secs. | 352 | 310 | 13.2 | |
| 36 secs. | 355 | 312 | 12.7 | |
| 38 secs. | 356 | 317 | 12.2 | |
| 40 secs. | 357 | 320 | 12.0 | |
| 43 secs. | 360 | 330 | 12.6 | |
| 46 secs | 360 | 333 | 12.6 | |
| 48 secs. | 360 | 340 | 12.6 | |
| 50 secs. | 360 | 355 | 12.5 | |
| 53 secs. | 362 | 380 | 12.8 | |
| 60 secs. | 362 | 400 | 12.3 | |
| 65 secs. | 365 | 430 | 13.1 | |
| 70 secs. | 366 | 453 | 13.8 | |
| 80 secs. | 368 | 480 | 13.2 | |
| 85 secs. | 368 | 503 | 13.3 | (Regen off) |
| 90 secs. | 350 | 520 | 13.2 | |
| 95 secs. | 323 | 540 | 13.0 | |
| 100 secs. | 310 | 560 | 12.8 | |
| 110 secs. | 295 | 570 | 12.0 | (Max. Temp.) |
| 120 secs. | 290 | 540 | 11.3 | |
| 150 secs. | 280 | 505 | 10.6 | (Cooling) |

TABLE II-continued

| Time | Inlet Temp °C. | Outlet Temp °C. | Back Pressure ins $H_2O$ |
|---|---|---|---|
| 180 secs. | 270 | 440 | 10.0 |

From the above results, it can be seen that the "fuel" is ideally suited for cooperating with the supported catalyst 13 for igniting stored particles in filter 10. Operation in the manner as described above would be continued until a substantial portion of the stored particles in filter 10 are burned up which can be indicated by the sensing of filter temperatures approaching and/or exceeding 600° C., with that signal causing the controller/monitor unit 54 to terminate the regeneration sequence. It should be noted that the 600° C. is a target temperature and the necessary cleaning temperature may vary from vehicle to vehicle.

At the end of the regeneration cycle the operation of the butterfly valves would be returned to their normal condition pending actuation again of the monitoring unit 54.

Under certain high speed or high loud conditions exhaust temperatures may be sufficient to maintain combustion of carbon particles and a separate regeneration cycle would not then be needed. Accordingly, controller/monitor unit 54 could be pre-programmed to not actuate the regeneration process under such conditions regardless of the number of revolutions as the sensing of temperatures in excess of 600° C. (or the target temperature), which would be expected under such driving conditions or loads would reset the revolution counter, N, back to zero, as is also done at the end of a regeneration sequence. Thus, anytime temperatures within filter 13 exceed 600° C. then separate regeneration efforts would not be required and the controller/monitor unit 54 would automatically reset the revolution counter to zero. Similarly, if temperatures are too low to allow proper regeneration, such as below 200° C., controller/monitor unit 54 will also fail to actuate regeneration procedures until filter temperatures are in excess of about 250° C. as is shown on the flow diagram in FIG. 5. This would also inhibit regeneration operation upon starting when the engine and likewise the filter were cold.

It should be understood that with respect to the "fuel" being delivered to the catalytic filter, the carbon monoxide and hydrocarbon fractions will be catalytically oxidized with the catalytic crystals generating an exotherm due to liberation of heat created by this oxidization. It is this oxidization of the hydrocarbon and CO fractions that causes the catalytic crystals to become hot, or to at least create hot spots, and thus serve to ignite the carbonaceous particulate material trapped within the catalytic filter.

An enlarged view of one of the butterfly valves, 44, is shown in FIG. 3a. FIG. 3b shows a rotatable vane 64 which could be used in lieu of the butterfly valve 44 shown in FIG. 3a.

During the regeneration sequence, vance 64, if used, would be rotated at a variable speed and would produce two progressive closing and opening sequences during each full 360° revolution. As with the butterfly valves, I prefer to link vanes 64 in pairs, when used on a four cylinder engine, although other operating procedures are possible and in some instances desirable.

An alternative exemplary apparatus according to the present invention is also illustrated in FIG. 4. Here, valves 44', 46', 48' and 50' are all tied together and controlled simultaneously by the actuator system 52. However, valves 44' and 50' have their movement controlled by stops 64 so that valves 44' and 50' can only be closed partially notwithstanding that they are actuated at the same time and together with valves 46' and 48'. In this way, only partial throttling of the intake air supplied by valves 44' and 50' will occur while there will be almost full throttling of valves 46' and 48'.

As one example of an operation procedure, however, where the engine 25 is a four cylinder diesel engine for a motor vehicle, the vehicle is accelerated to 55 miles per hour, the regenerator system is operated for 90 seconds while maintaining the 55 mile per hour speed, the regenerator system is turned off, and normal driving ensues. During operation of the regenerator system according to the invention, the driver is not usually able to perceive regenerator operation. Thus, the catalyzed filter is simply and efficiently regenerated without perceptable adverse consequences, and without requiring heating of the exhaust stream.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods and apparatus.

What I claim is:

1. A method for regenerating a catalyzed particulate filter for an internal combustion engine having a plurality of cylinders comprising the steps of: during operation of the engine cyclically pulsating the intake air flow to a predetermined number of said plurality of cylinders so that the exhaust therefrom will generate an exotherm on the catalyst thereby igniting particulate material within the filter.

2. A method as in claim 1 wherein said predetermined number of cylinders is less than all of said pluralty of cylinders.

3. A method as in claim 2 wherein the exhaust from said predetermined number of cylinders is low in $O_2$ and high in CO and HC while the exahust from the remaining cylinders is rich in $O_2$.

4. A method as in claim 1, wherein said pulsating of the intake air step is practiced periodically.

5. A method as in claim 4 wherein said pulsating of the intake air is practiced by cycling the flow of intake air on and off, with both on and off cycle times ranging from about 0.25 sec. to about 30 sec.

6. A method as in claim 4 wherein the pulsating step is practiced by shutting off intake air flow for about 1.5 sec. and opening intake air flow for about 0.5 sec.

7. A method as in claim 1 including the additional step of monitoring the back pressure produced by the filter, wherein said pulsating of the intake air step is practiced automatically in response to a predetermined back pressure.

8. A method as in claim 1 including the additional step of monitoring engine operation and wherein said pulsating of the intake air step is practiced automatically in response to predetermined sensed engine operating conditions.

9. A method as in claim 1 including the additional step of monitoring the temperature of said catalyzed filter and where in said pulsating of the intake air step is practiced automatically in response to predetermined sensed filter temperatures.

10. A method as in claim 1 wherein said pulsating of the intake air step is practiced by throttling the intake air to predetermined ones and less than all of said cylinders.

11. A method as in claim 10, wherein throttling is continued for about 75% of each pulsating step.

12. A method as in claim 10, wherein intake air to one half of the cylinders are throttled and intake air to the other half are unthrottled.

13. A method as in claim 10, wherein the intake air to one half of the cylinders are throttled and intake air to the other half are partially throttled.

14. A method as in claim 1, wherein the pulsating of the intake air step is practiced by controlling the timing for a predetermined period of time of the intake air supplied to said less than all the cylinders so that the fuel introduced thereto will not fully combust producing a low oxygen, high CO, HC exhaust of said less than all of the cylinders and by providing normal intake air to the remaining cylinders so that normal fuel combustion occurs; and comprising the additional step of, after passage of said predetermined period of time, controlling the intake air for each cylinder so that substantially all of the fuel introduced into each combusts.

15. A method as in claim 1, wherein said pulsating of the intake air step is practiced by controlling the intake air supplied to at least one cylinder so that there is insufficient oxygen producing incomplete combustion of fuel injected into said at least one cylinder leaving a substantial amount of uncombusted fuel in the exhaust therefrom; and comprising the further step of, after regeneration of the catalytic filter, controlling the intake air to said engine so that substantially all the fuel supplied to each cylinder is combusted.

16. A method as in claim 1, wherein said pulsating of intake air step is practiced so that an exotherm is generated raising the maximum effective temperature in the filter to above 350° C.

17. A method of regenerating a catalyzed particulated filter disposed in the exhaust stream of an internal combustion engine having a plurality of cylinders operated by a fuel supply, comprising the steps of: during operation of the engine, pulsating the intake air supply to less than all of said plurality of cylinders over a period of time, thereby presenting to the catalyzed filter above its light-off temperature gaseous uncombusted fuel sufficient to generate an exotherm so that the catalyzed filter heats up and ignites stored particulates in the filter over said period sufficient to burn up a substantial quantity of particulates stored in the filter.

18. A method as in claim 17, wherein the air supply to the remaining cylinders is partially throttled.

19. An apparatus comprising:
an internal combustion engine having a plurality of cylinders, an intake air supply, an exhaust stream, and a fuel supply;
a catalyzed particulate filter disposed in the combustion source exhaust stream;
the combustion source and filter comprising a source-filter system; and
means for pulsating intake air to less than all of said cylinders, during operation of the combustion source, to the source-filter system to that an amount of uncombusted fuel sufficient to ignite stored particulates in the filter is supplied to the filter.

20. Apparatus as in claim 19, wherein said pulsating intake air means comprises means for throttling intake air to at least one half of said plurality of cylinders.

21. Apparatus as in claim 20, wherein said fuel supplying means comprises means for controlling the timing of the pulsating of said intake air for a predetermined period of time so that a predetermined quantity of fuel in said cylinders will not fully combust; and said control means further comprising means for, after passage of said predetermined period of time, controlling the timing so that substantially all of the fuel introduced to said engine combusts.

22. Apparatus as in claim 19 further including control means for automatically controlling the supply of said intake air, said control means including sensor means for producing at least a first signal in response to sensing of a predetermined condition and actuating means for actuating said pulsating intake air means in response to said signal.

23. Apparatus as recited in claim 20, wherein said combustion source comprises an internal combustion engine having a plurality of cylinders; and wherein said pulsating intake air means comprises means for controlling the amount of intake air supplied to at least one of said cylinders so that the combustion oxygen is depleted before full combustion of the fuel is effected, leaving a substantial amount of uncombusted fuel in the cylinder exhaust; and wherein said pulsating intake air means further comprises means for, after catalyzed filter regeneration, controlling the amount of the intake air supplied so that substantially all the fuel supplied to each cylinder is combusted.

* * * * *